United States Patent [19]

Yuk

[11] Patent Number: 4,900,988
[45] Date of Patent: Feb. 13, 1990

[54] HIGH VOLTAGE STABILIZING CIRCUIT FOR PREVENTING OVERHEAT

[75] Inventor: Geun J. Yuk, Kyungsangbook, Rep. of Korea

[73] Assignee: Goldstar Co., Ltd., Seoul, Rep. of Korea

[21] Appl. No.: 140,095

[22] Filed: Dec. 31, 1987

[30] Foreign Application Priority Data

Dec. 31, 1986 [KR] Rep. of Korea ............... 22114/1986

[51] Int. Cl.⁴ .............................................. H01J 29/70
[52] U.S. Cl. .................................... 315/411; 315/387; 358/190

[58] Field of Search ............... 315/364, 370, 371, 387, 315/399, 403, 408, 411; 358/174, 176, 177, 178, 190, 243

[56] References Cited

U.S. PATENT DOCUMENTS 4,614,899  9/1986  Webb et al. ..................... 315/387 X Primary Examiner—David Mis
Attorney, Agent, or Firm—Birch, Stewart, Kolasch & Birch

[57] ABSTRACT

A high voltage stabilizing circuit in a monitor, which has various horizontal synchronized frequencies input thereto. The high voltage stabilizing circuit allows the heating of the voltage control transistor to be reduced.

8 Claims, 2 Drawing Sheets

HIGH VOLTAGE STABILIZING CIRCUIT FOR PREVENTING OVERHEAT

This invention relates to a novel high voltage stabilizing circuit for a monitor.

BACKGROUND OF THE INVENTION

Prior to the present invention, problems have existed and difficulties have been associated with the now widely used monitor. For example, in a high voltage stabilizing circuit of the monitor according to the prior art, the control transistor of the power control part may become overheated by the excessive power consumption in the transistor as the difference of power applied to the flyback transformer increases when high or low horizontal synchronization frequencies are applied to the high voltage stabilizing circuit, and the control transistor may often be damaged.

THE SUMMARY OF THE INVENTION

One object of the present invention is to overcome and avoid the difficulties and disadvantages described above.

Another object of this invention is to improve high voltage stabilization in response to the variation of frequencies. Because high voltage can be stabilized by changing the power applied to the flyback transformer as horizontal synchronization frequencies varies the high voltage stabilization may be improved.

A further object of this invention is to provide an high voltage stabilizing circuit for reducing power consumption in the control transistor which prevents overheating.

DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION OF THE PREFERRED EMBODIMENT

Figure 1:
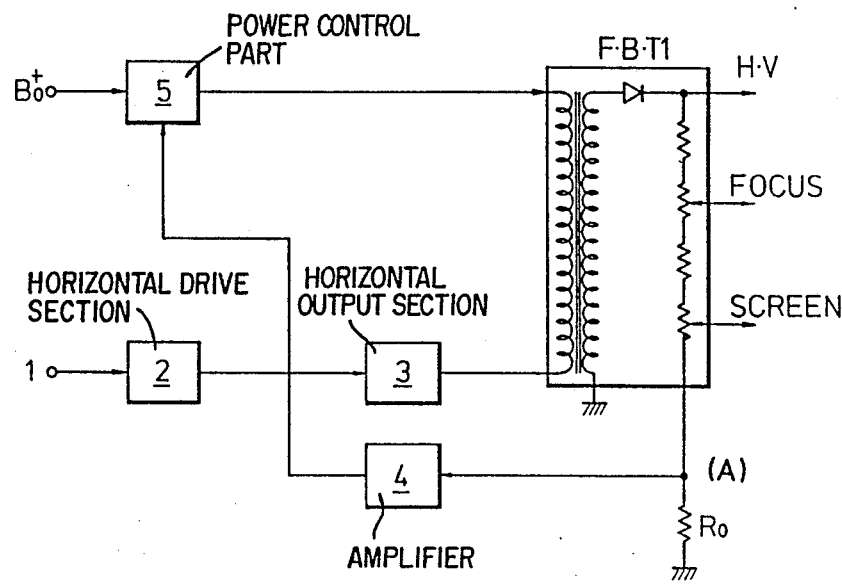
FIG. 1 illustrates a block diagram for a prior art high voltage stabilizing circuit.

As illustrated in FIG. 1, the composition of the prior art circuit will be explained as follows.

A horizontal drive section (2) and a horizontal output section (3) are connected to a horizontal synchronization signal terminal (1) and a primary coil of a flyback transformer (FBT$_1$). The power supply (B$_0$+) is connected to the primary coil of flyback transformer (FBT$_1$) through the power control part (5), and the secondary coil of the flyback transformer (FBT$_1$) is connected to ground through the internal resistance and a resistor (R$_0$). An amplifier (4) is connected to a node (A) between the internal resistance and the resistor (R$_0$) to the output terminal of the power control part (5).

The manner of operation of the various elements described in connection with the FIG. 1 will be explained particularly. The power supply is induced at the primary coil of flyback transformer (FBT$_1$) through the power control part (5). When a horizontal synchronization frequency of "A" KH$_z$ is applied into the horizontal synchronization signal terminal (1), the horizontal synchronization frequency is applied to the horizontal output section (3) through the horizontal drive section (2), and a constant high voltage is applied to the high voltage terminal (H.V.). At this time, if a horizontal synchronization frequency of "B" KH$_z$, which is higher than the frequency of "A" KH$_z$, is applied to the horizontal synchronization signal terminal (7), the high voltage following the increased horizontal synchronization frequency is lowered, and a voltage drop will occur at the node (A).

Therefore, the amplifier (4) detects and amplifies this voltage drop. Then, the amplified voltage is applied to the power control part (5) which raises the power supply (B$_0$+) and stabilizes the high voltage.

Again, if a horizontal synchronization frequency of "C" KH$_z$, which is higher than "B" KH$_z$, is applied to the horizontal synchronization signal terminal (1), the high voltage response will be lowered from the increased horizontal synchronization and the voltage drop will increase at the node (A). The amplifier (4) detects and amplifies this voltage drop. Then, the amplified voltage is applied to the power control part (5) which raises the power supply (B$_0$+) and produces a constant and stabilized high voltage at the high voltage terminal (H.V.).

In a comparison between the power supply for a low horizontal synchronization frequency of "A" KH$_z$ being applied to the horizontal synchronization signal terminal and a high horizontal synchronization frequency of "C" KH$_z$ being applied to the horizontal synchronization signal terminal, the required power consumption at the control transistor of power control part becomes large due to the large difference between the power supplies. Therefore, the control transistor will become overheated by the heat transformed from the consumed power supply, and the control transistor will often be damaged.

Figure 2:
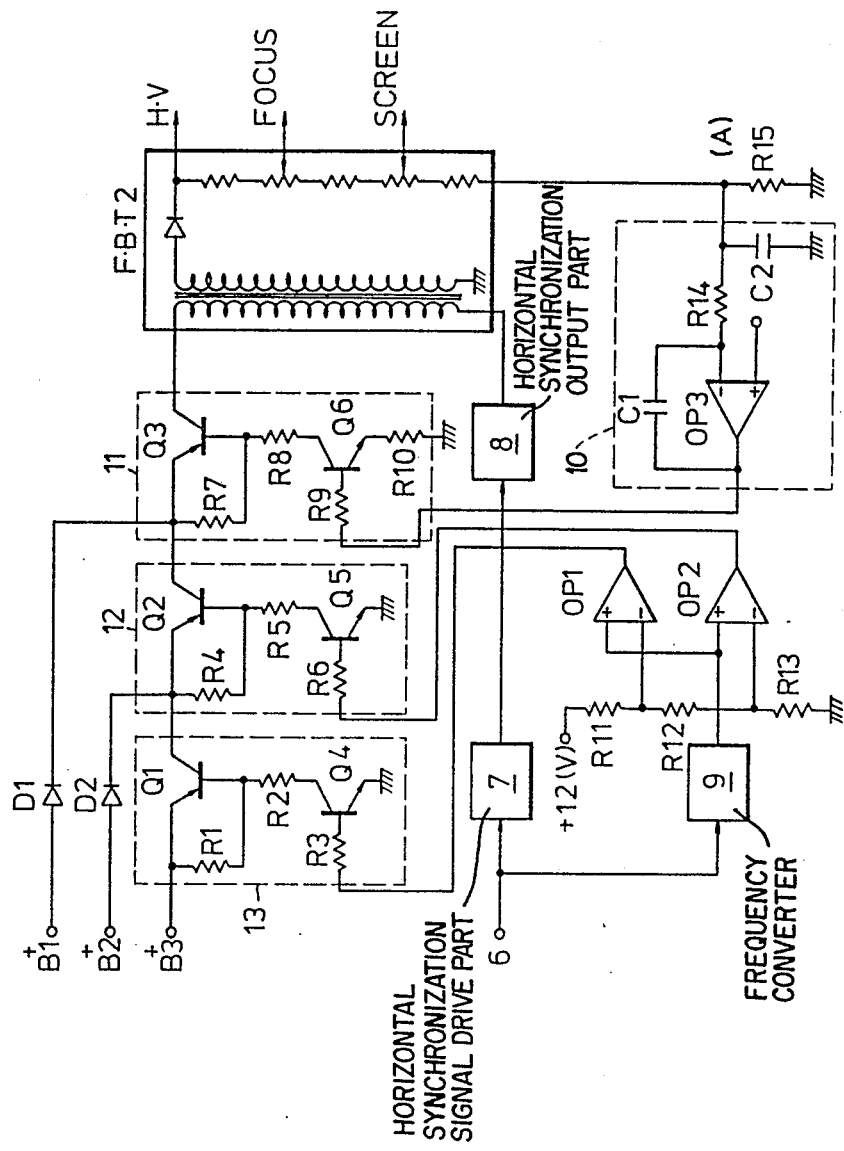
FIG. 2 illustrates a high voltage stabilizing circuit for an embodiment of the present invention.

The circuit composition for an embodiment of this invention shall be explained in connection with FIG. 2.

A horizontal synchronization signal terminal (6) is connected to the primary coil of a flyback transformer (FBT$_2$) through a horizontal synchronization signal drive part (7) and a horizontal synchronization output part (8), the secondary coil of the flyback transformer (FBT$_2$) is connected to a high voltage terminal (H.V.) through a diode and the diode is connected to ground through an internal resistance and a resistor (R$_{15}$). Node (A) of the above described resistors is connected to the amplifying part (10). The output of the amplifying part (10) is connected to a first power control part (11) which consists of transistors (Q$_3$) and (Q$_6$) and resistors (R$_7$–R$_{10}$). The output of the first power control part (11) is connected to the primary coil of the flyback transformer (FBT$_2$). The horizontal synchronization signal terminal (6) is connected to a frequency converter (9). The output of the frequency converter (9) is connected to the positive (+) input terminals of comparators (OP1) and (OP2). The reference voltage divided by resistors (R$_{11}$–R$_{13}$) is applied to the negative (−) input terminals of comparators (OP1) and (OP2).

The output terminal of comparator (OP2) is connected to the base of a transistor (Q$_5$) through a resistor (R$_6$) of a second power control part (12). The emitter of the transistor (Q$_5$) is connected to ground and the collector of the transistor (Q$_5$) is connected to the base of a transistor (Q$_2$) and a bias resistor (R$_4$) through a resistor (R$_5$). The collector of the transistor (Q$_2$) is connected to the power supply (B$_1$+) through a diode (D$_1$)

and to the input terminal of the first power control part (11).

The output terminal of the comparator (OP$_1$) is connected through a resistor (R$_3$) of third power control part (13) to the base of a transistor (Q$_4$), and the emitter of the transistor (Q$_4$) is connected to ground. The collector of the transistor (Q$_4$) is connected to a bias resistor (R$_1$) and the base of a transistor (Q$_1$) through a resistor (R$_2$). The collector of the transistor (Q$_1$) is connected to the power supply (B$_2$+) through a diode (D$_2$) and to the input terminal of the second power control part (12). The collector of the transistor (Q$_1$) is connected to the power supply (B$_3$+).

The manner for operation of the various elements described in connection with the FIG. 2 will be explained particularly, as follows.

Initially, the relation of the horizontal synchronization frequencies are defined as "A" KH$_z$<"B" KH$_z$<"C" KH$_z$<"D" KH$_z$ and the relation of the power supplied are defined as B$_1$+ (V)<B$_2$+(-V)<B$_3$+(V). Therefore, the horizontal synchronizing frequency of "A" KH$_z$ is input to the horizontal synchronization signal terminal (6) and the horizontal synchronization pulse is output through the horizontal synchronization drive part (7) and the horizontal synchronization output (8). The voltage which is developed from the horizontal synchronization frequency of "A" KH$_z$ is applied to (+) input terminals of the comparators (OP$_1$) and (OP$_2$) by the frequency converter (9), but the voltage is lower than the divided voltage that is applied at the (−) input terminal of the comparators (OP$_1$) and (OP$_2$). Thereby, the outputs of the comparators (OP$_1$) and (OP$_2$) are applied to the second power control part (12) and the third power control part (13) in a low state.

The control transistor (Q$_1$) is turned off in response to turning off the transistor (Q$_4$) by cutting off the power supply (B$_3$+). The transistor (Q$_2$) is turned off in response to turning off the transistor (Q$_5$) by cutting off the power supply (B$_2$+). Therefore, only the power supply (B$_1$+) is applied to the flyback transformer (FBT$_2$) through the control transistor (Q$_3$) of the first power control part (11), then and stabilized high voltage is output at the high voltage terminal (H.V.). At this time, if the horizontal synchronization frequency is applied to the horizontal synchronizing signal terminal (6), the output voltage of the frequency converter (9) increases and is applied to the (+) input terminals of the comparators (OP$_1$) and (OP$_2$). The output voltage is higher than the divided voltage that is applied to the (−) input terminal of the comparator (OP$_2$) but the voltage is lower than the divided voltage that is applied to the (−) input terminal of the comparator (OP$_1$). Then, the output of the comparator (OP$_1$) is applied to the third power control part (13) as a low state and the output of the comparator (OP$_2$) is applied to the second power control part (12) as a high state.

Accordingly, transistors (Q$_1$) and (Q$_4$) of the third power control part (13) are turned off in turn, the power supply (B$_3$+) is cut off, and transistors (Q$_2$) and (Q$_5$) of the second power control part (12) are turned on in the regular order. The power supply (B$_2$+) is applied to the flyback transformer (FBT$_2$) through the transistors (Q$_2$) and (Q$_3$) by turns, so that a constant high voltage is given by attenuating the drop of the voltage and raising the horizontal synchronization frequency.

On the other hand, if the horizontal synchronization frequency of "C" KH$_z$ is input to the horizontal synchronization signal terminal (6), the output voltage of the frequency converter (9) further increases and the outputs of the comparators (OP$_1$) and (OP$_2$) are applied to the second power control part (12) and the third power control part (13) as a high state.

Therefore, the transistors (Q$_5$) and (Q$_2$) of the second power control part (12) and the transistors (Q$_4$) and (Q$_1$) of the third power control part (13) are turned on and the power supply (B$_3$+) is applied to the flyback transformer (FBT$_2$) through the transistors (Q$_1$), (Q$_2$), and (Q$_3$). Thereby, so the constant high voltage is given by an attenuation of the high voltage drop in accordance with an increase of the horizontal synchronization frequency.

At this time, if the horizontal synchronization frequency of "D" KH$_z$ is applied to the horizontal synchronization signal terminal (6), the output of the frequency converter (9) increases, but the output voltages of the comparators (OP$_1$) and (OP$_2$) are in a constant high state. Therefore, the high voltage caused by applying the high horizontal synchronization frequency to the flyback transformer (FBT$_2$) drops down in response to a continuous supply from the power supply (B$_3$+) at the flyback transformer (FBT$_2$).

However, at the same time, the amplifying part (10) detects the lowering voltage at the node (A) in response to a high voltage drop, and raises the base voltage of the boost-up transistor (Q$_6$) of the first power control part (11). Consequently, the control transistor (Q$_3$) is greatly biased and the high voltage is stabilized by the power supply (B$_3$+) that is applied to the primary coil of the flyback transformer (FBT$_2$) and a constant voltage is produced at the high voltage terminal (H.V.).

As described above, the second and the third power control parts switch each power supply and the first power control part controls minute voltage variations. Thereby, the power consumption of the transistor is greatly reduced and the overheating of the transistor may be prevented.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A high voltage stabilizing apparatus comprising:
horizontal synchronization drive means for developing a drive signal in response to a horizontal synchronization signal input thereto;
horizontal synchronization output means for developing a pulse signal in response to said drive signal;
frequency converting means for developing first and second input signals in response to said horizontal synchronization signal;
a first comparator for developing a first comparison signal responsive to said first input signal and a first reference signal input thereto;
a second comparator for developing a second comparison signal responsive to said second input signal and a second reference signal input thereto;
third power control means for developing a third control output signal in response to said first comparison signal and a third power supply input thereto;
second power control means for developing a second control output signal in response to said third control output signal, a second power supply and said second comparison signal input thereto;

first power control means for developing a first control output signal in response to said second control output signal and a first power supply input thereto;

flyback transforming means having a primary coil and a secondary coil for developing a high voltage output signal in response to said first control output signal being connected to a first node of said primary coil and said drive signal being connected to a second node of said primary coil; and amplifying means being connected to said secondary coil for developing an amplified control signal to said first power control means, said first, second, and third power supplies being applied to said flyback transforming means in response to said horizontal synchronization signal.

2. A high voltage stabilizing apparatus according to claim 1, further comprising a voltage divider for developing said first and second reference signals.

3. A high voltage stabilizing apparatus according to claim 2, wherein said voltage divider comprises a predetermined voltage source and first, second, and third resistors.

4. A high voltage stabilizing apparatus according to claim 1, wherein said first power control means comprises a first transistor being connected to said amplified control signal through a first resistor, and a second resistor being connected to said first power supply, said control signal and a second resistor.

5. A high voltage stabilizing apparatus according to claim 1, wherein said second power control means comprises a first transistor being connected to said second comparison signal through a first resistor, and a second transistor being connected to said second power supply, said second control signal and a second resistor.

6. A high voltage stabilizing apparatus according to claim 1, wherein said third power control means comprises a first transistor being connected to said first comparison signal through a first resistor, a second transistor being connected to said third power supply and a second resistor.

7. A high voltage stabilizing apparatus according to claim 1, wherein said flyback transforming means comprises a flyback transformer having said primary coil and said secondary coil, and a diode, internal resistance and a first resistor being connected to a node of said secondary coil.

8. A high voltage stabilizing apparatus according to claim 2, wherein said amplifying means comprises a first capacitor and a first resistor being connected to said secondary coil, a second capacitor, and a third comparator being connected to said first power control means.

* * * * *